Feb. 23, 1926.
E. W. SAUNDERS
STORM FRONT FOR VEHICLES
Filed Oct. 27, 1923
1,574,309
2 Sheets-Sheet 1
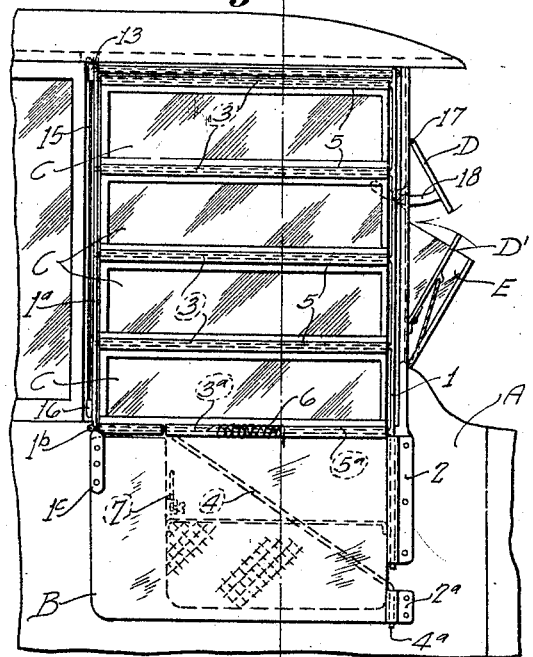
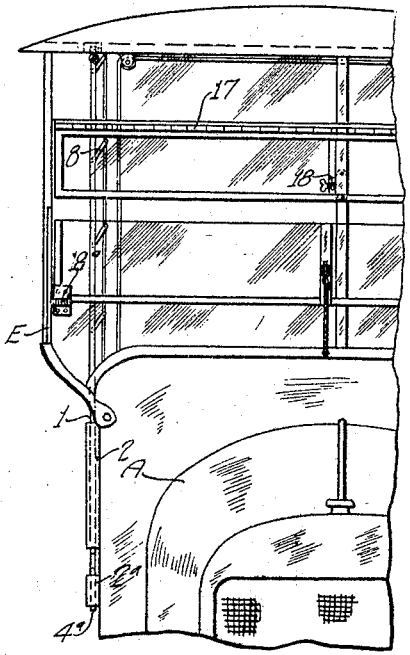
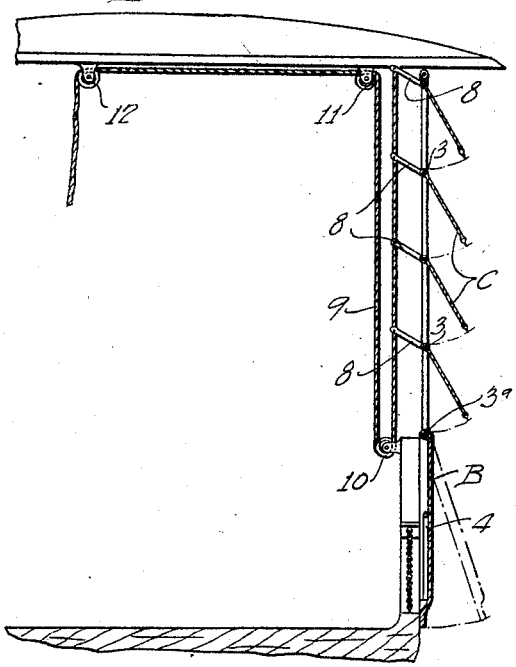
INVENTOR
Edward W. Saunders,
By Bakewell & Church
ATTORNEYS Feb. 23, 1926.
E. W. SAUNDERS
1,574,309
STORM FRONT FOR VEHICLES
Filed Oct. 27, 1923    2 Sheets-Sheet 2
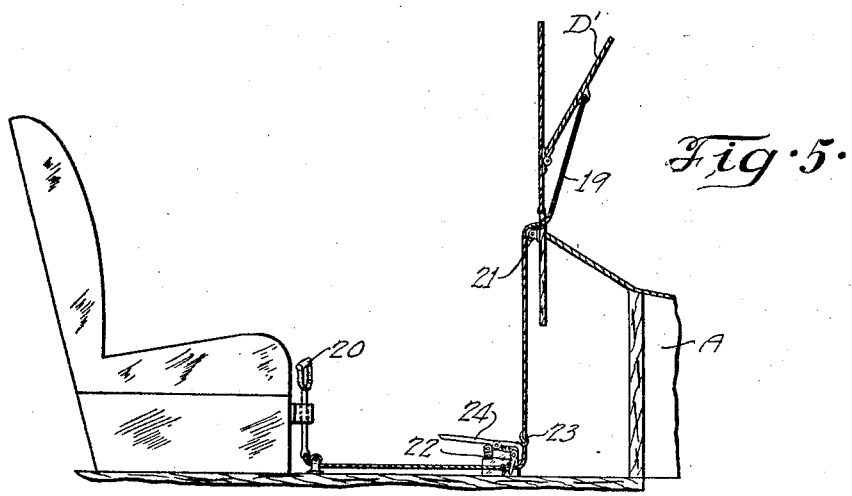
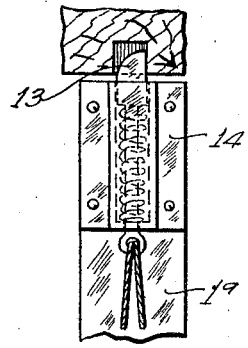
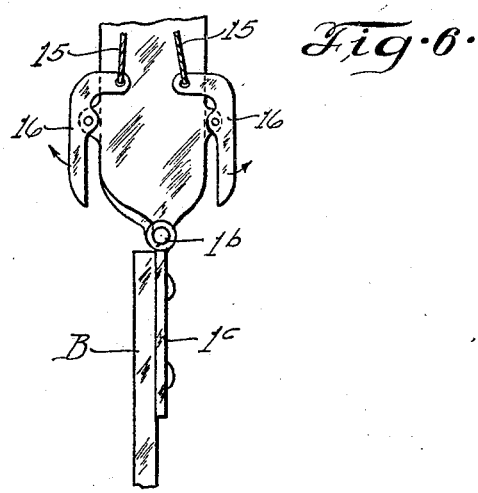
INVENTOR
Edward W. Saunders.
By Bakewell & Church
ATTORNEYS Patented Feb. 23, 1926.

1,574,309

UNITED STATES PATENT OFFICE.

EDWARD W. SAUNDERS, OF ST. LOUIS, MISSOURI.

STORM FRONT FOR VEHICLES.

Application filed October 27, 1923. Serial No. 671,209.

*To all whom it may concern:*

Be it known that I, EDWARD W. SAUNDERS, a citizen of the United States, residing at St. Louis, Missouri, have invented a certain new and useful Improvement in Storm Fronts for Vehicles, of which the following is a full, clear, and exact description, such as will enable others skilled in the art to which it appertains to make and use the same.

This invention relates to storm fronts for vehicles, and has for one of its objects to provide a vehicle door composed of a solid lower portion and an upper portion formed by a plurality of movable, transparent panels that can be opened and closed easily by an occupant of the vehicle, so as to provide an unobstructed view for the occupants sidewise from the vehicle when said panels are covered with snow, rain or ice.

Another object is to provide a vehicle door of the type referred to in which the lower solid portion of the door is mounted in such a way that the lower edge portion of same can be swung outwardly to ventilate the passenger compartment of the vehicle without disturbing or changing the position of the transparent panels that constitute the upper portion of the door.

Other objects and desirable features of my invention will be hereinafter pointed out.

Figure 1 of the drawings is a side elevational view of a portion of an automobile body equipped with a storm front constructed in accordance with my invention.

Figure 2 is a front elevational view of a portion of the automobile shown in Figure 1.

Figure 3 is a transverse sectional view, taken on the line 3—3 of Figure 1.

Figure 4 is a view illustrating how my improved door is adapted to be swung outwardly away from the vehicle body to open said door.

Figure 5 is a longitudinal sectional view of the front seat compartment of the vehicle, showing the mechanism for operating one of the transversely-disposed panels in the front portion of the closure for the front seat compartment; and Figure 6 illustrates one form of locking device that may be used for retaining the door in its closed position.

I have herein illustrated my invention embodied in a storm front for automobile bodies, but I wish it to be understood that my improved storm front is capable of use with various other kinds of vehicles.

Referring to the drawings which illustrate the preferred form of my invention, A designates an automobile body that is provided with a door composed of a lower solid portion B and an upper portion composed of a plurality of transparent panels C. The door as an entirety swings or oscillates on a vertical axis and the lower portion B of the door is mounted in such a way that the lower end portion of same can be swung outwardly without disturbing or affecting the position of the panels C so as to ventilate the front seat compartment of the vehicle. In the form of my invention herein illustrated the door is carried by a hinge which comprises a vertically-disposed rod 1 supported by a stationary hinge member 2 on the body A of the vehicle and provided with a plurality of horizontally-disposed hinge pintles 3 on which the transparent panels C are oscillatingly mounted, and a horizontally-disposed hinge pintle $3^a$ on which the lower solid portion B of the door is oscillatingly mounted. The hinge pintles 3 and $3^a$ are rigidly connected at one end to the vertical rod 1 and the opposite ends of said hinge pintles are rigidly connected to a vertical bar or rod $1^a$ arranged in parallel relation with the rod 1 and having its lower end connected by a hinge $1^b$ to a bracket $1^c$ on the lower solid portion B of the door. If desired, an inclined brace 4 can be used to prevent the door from sagging, said brace being connected in its upper end to the hinge pintle $3^a$ and provided at its lower end with a vertically-disposed portion $4^a$ which is journaled in a stationary hinge member $2^a$ on the automobile body A arranged in vertical alignment with the stationary hinge member 2 on said body. Each of the transparent panels C is provided at its upper edge with a tubular member 5 through which one of the hinge pintles 3 passes, and the solid lower portion B of the door is provided in its upper edge with a tubular portion $5^a$ through which the hinge pintle $3^a$ passes.

The lower portion B of the door is normally maintained in a vertical position by means of a torsion spring 6, shown in Figure 1, that is combined with the hinge pintle $3^a$ and the portion $5^a$ through which said pintle passes in such a way as to exert pressure on the lower portion B of the door in a direction tending to hold it against the inclined brace 4. In case it is desired to ventilate the front seat compartment of the vehicle without opening the panels C that constitute the upper portion of the door, the lower portion B of the door can be swung outwardly into the position shown in broken lines in Figure 3, and retained in said position by any suitable means, such, for example, as an adjustable brace 7, shown in broken lines in Figure 1. Means is provided for enabling the operator in charge of the vehicle to open and close the transparent panels C, and while said means may be constructed in various ways without departing from the spirit of my invention, I prefer to provide each of the panels C with an angularly-disposed arm 8, as shown in Figure 3, that is connected to an operating cable 9 which is within easy reach of the operator. As shown in Figure 3, the cable 9 extends downwardly from the arms 8 under a pulley 10, then upwardly over a pulley 11, and thence transversely of the vehicle to a pulley 12. Accordingly, if the operator or driver is seated at the left hand side of the vehicle, he can grasp the cable 9 and pull downwardly on same, so as to swing the panels C upwardly into their open position, thereby giving the operator an unobstructed view to the right and reducing the liability of accidents in inclement weather when the vehicle is approaching an intersecting street or roadway. Any suitable means can be used for retaining the door in its closed position, such, for example, as a spring-actuated bolt 13 slidingly mounted in a bearing 14 carried by the vertically-disposed bar 1ª at the outer edge of the door and connected by cables 15 to operating levers 16, as shown in Figure 6, that are arranged on the inside and on the outside of the door, so as to enable the bolt 13 to be retracted or rendered inoperative by a person standing on the outside of the vehicle or seated in the front seat compartment of the vehicle.

In addition to the door just described, my improved storm front comprises a front portion that has two transversely-disposed transparent panels D and D' which are capable of being adjusted in such a way as to form a clear vision slot between the meeting edges of same. The panel D is preferably hinged at its upper edge, as indicated by the reference character 17 in Figure 2, and is equipped with an arc-shaped arm 18 or other suitable means by which said panel can be held in an inclined or partially raised position, as shown in Figure 1. The panel D' is hinged at its lower edge so that when said panel is swung forwardly into the position shown in Figure 1 a clear vision slot will be provided between the adjacent edges of the panels D and D'. Any means can be used for mounting the panel D', such, for example, as spring hinges 18ª that normally hold said panel in a vertical or upright position, but which permit said panel to be swung forwardly into the position shown in Figure 1. Shields E that are arranged at the ends of the panels D' prevent air, rain, snow or the like from beating inwardly into the vehicle around the ends of the panel D'. In order that the operator can swing the panel D' forwardly into its open position, shown in Figure 1, without altering his position behind the steering wheel of the vehicle, an operating cable 19 is connected to the panel D' and to an operating rod 20 arranged in close proximity to the operator, the cable 19 leading downwardly from the panel D' over a pulley 21, and thence under a holding device to the operating rod 20, as shown in Figure 5. The holding device just referred to is formed preferably by a pivotally mounted pawl 22 that co-operates with knots 23 in the cable 19 to retain the panel D' in its open or partially open position. When the operator pulls upwardly on the operating rod 20 one or more of the knots 23 in the cable 19 will travel past the pawl 22, and when the operator releases said rod, one of the knots 23 will strike against the pawl 22 and thus move it in a direction to cause said pawl to hold the cable 19. When it is desired to close the panel D' the operator presses downwardly on a foot pedal 24 on which the pawl 22 is pivotally mounted, thereby raising said pawl sufficiently to release the cable 19 and permit the spring hinges 18ª to restore the panel D' to its closed position.

Having thus described my invention, what I claim as new and desire to secure by Letters Patent is:

1. A door for vehicles having an upper portion formed by a plurality of hinged, horizontally-disposed, transparent panels, and a lower portion arranged so that it can swing on a horizontal axis located at the top edge of same.

2. A door for vehicles, comprising a structure that swings on a vertical axis, horizontally-pivoted, transparent panels on said structure that form the upper portion of the door, and a solid lower portion mounted on said structure in such a way that it can be swung on a horizontal axis located at the top edge of said lower portion.

3. A door for vehicles, comprising a structure that swings on a vertical axis, said structure having a plurality of horizontally-disposed hinge pintles, transparent panels oscillatingly mounted on some of said pintles and constituting the upper portion of the door, and a solid portion at the lower end of the door oscillatingly mounted at its upper edge on one of said pintles.

4. A door for vehicles, comprising a stationary hinge member, a vertically-disposed rod carried by said hinge member and provided with a plurality of horizontally-disposed hinge pintles arranged in parallel relation, a plurality of transparent panels oscillatingly mounted on some of said hinge pintles and constituting the upper portion of the door, and a solid part mounted on one of said hinge pintles and constituting the lower portion of the door.

5. A door for vehicles, comprising a stationary hinge member, a vertically-disposed rod carried by said hinge member and provided with a plurality of horizontally-disposed hinge pintles arranged in parallel relation, a plurality of transparent panels oscillatingly mounted on some of said hinge pintles and constituting the upper portion of the door, a solid part mounted on one of said hinge pintles and constituting the lower portion of the door, and means for preventing the door from sagging.

EDWARD W. SAUNDERS.